(No Model.)
J. J. POWERS.
APPARATUS FOR DISINFECTING SEWAGE.
No. 362,657. Patented May 10, 1887.
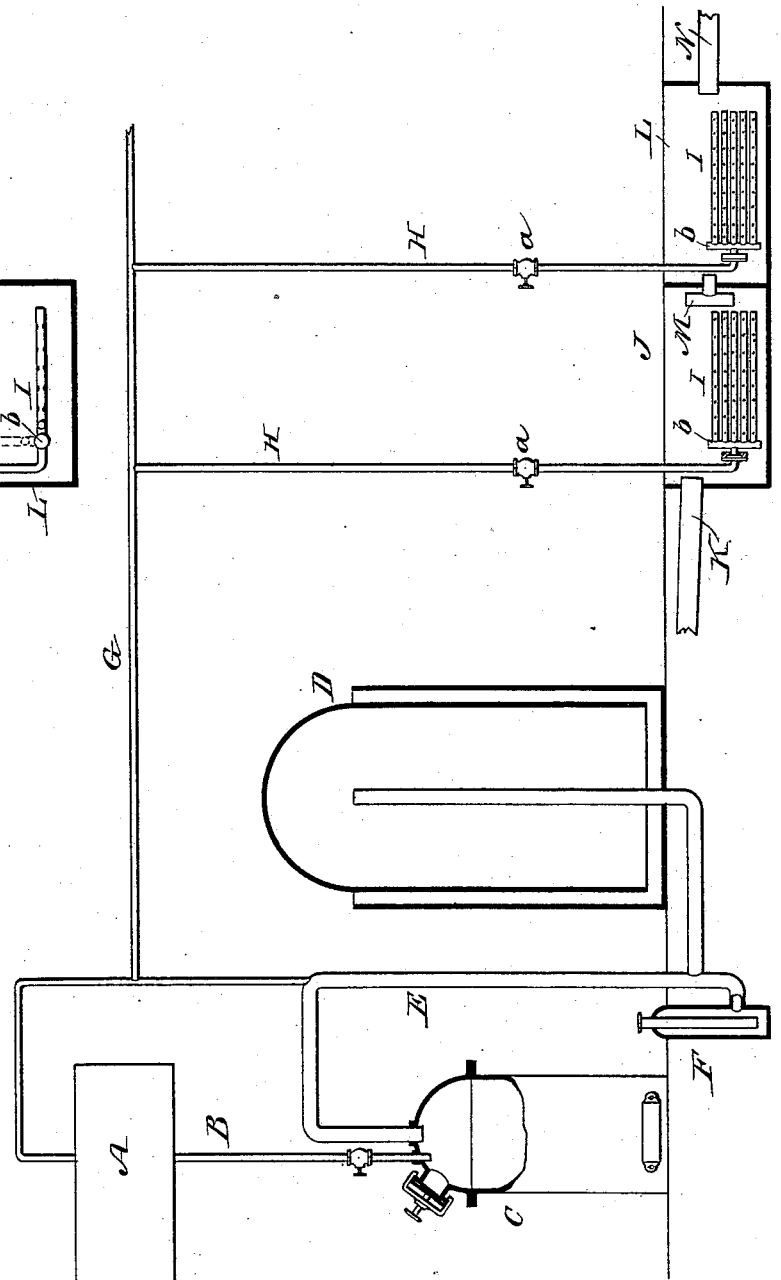
WITNESSES:
INVENTOR:
J. J. Powers
BY Munn & Co.
ATTORNEYS.

UNITED STATES PATENT OFFICE.

JAMES J. POWERS, OF BROOKLYN, NEW YORK.

APPARATUS FOR DISINFECTING SEWAGE.

SPECIFICATION forming part of Letters Patent No. 362,657, dated May 10, 1887.

Application filed July 1, 1886. Serial No. 206,818. (No model.)

*To all whom it may concern:*

Be it known that I, JAMES J. POWERS, of the city of Brooklyn, in the county of Kings and State of New York, have invented a new and Improved Apparatus for Disinfecting Sewage, of which the following is a full, clear, and exact description.

The object of my invention is to prevent noxious vapors and odors from rising and contaminating the air at the mouths of sewers; and my invention consists in discharging into the sewage as it issues from the sewer a disinfectant or precipitant, or both, in the form of gas.

Reference is to be had to the accompanying drawings, forming a part of this specification, in which similar letters of reference indicate corresponding parts in both the figures.

Figure 1 is a sectional and broken side elevation of a gas-generating and disinfecting apparatus, which I prefer to use in carrying out my method of disinfecting sewage, and Fig. 2 is a detail view of one of the tanks and one set of distributing-pipes, showing the latter jointed to the supply-pipe to enable them to be turned upward out of the tank for cleaning or for repairs.

A represents a storage-tank, to which is supplied sulphuric acid or other chemical, which is discharged through pipe B into the generator C, containing oxide manganese and salt or other chemical, the combination or decomposition of which will give off chlorine or other disinfecting or precipitating gas. The generator C is connected with the gas-holder D by the pipe E, which dips into the trap F, for collecting any water or liquid that may accumulate in the pipe E. The gas from the holder D is conducted by suitable pipes, G H, to the distributing-pipes I, which are perforated by numerous small holes, so that the gas issues from them in many small jets.

I prefer to employ two sets of the distributing-pipes I. The upper set is submerged in a collecting-tank, J, into and through which the sewage flows through a pipe, K. The tank J is connected with the tank L, in which the lower set of distributing-pipes I are placed, by the pipe M, so the sewage passes continuously from the tank J to the tank L, thence out through the pipe N.

The cumulative pressure of gas in the generator and holder forces the gas constantly through the pipes G H to the distributers, where the gases escape in jets into the accumulated sewage, and disinfect or precipitate (or both) the putrid and unhealthy matter contained therein, so that no unhealthy vapors or odors are given off into the air.

The pressure of the escaping gas may be regulated by the valves $a$ in the pipes H, so that only the required amount of gas may be used to completely saturate the sewage and produce the required result.

In some cases the distributing-pipes will be connected to a cross-pipe, $b$, which may be hinged or jointed to the supply-pipe H, so that the distributing-pipes may be swung upward out of the tank, as shown in dotted lines in Fig. 2, for cleaning or for repairs, without uncoupling the rest of the distributing-pipes from the supply-pipe.

While I have shown but two tanks L, it will be understood that a series may be used, each provided with distributing-pipes and gas supply pipes, so that the sewage in passing from tank to tank will be again and again subjected to the action of the disinfecting and precipitating gas.

The tanks J L are set in the ground somewhat below the level of the sewer-pipe K, so that the sewage is subjected to the action of the gaseous disinfectant or precipitant immediately upon issuing from the sewer-pipe, so that noxious and unhealthy vapors will have no opportunity to rise into the air.

Having thus described my invention, what I claim as new, and desire to secure by Letters Patent, is—

A tank or receptacle placed below the sewer-pipe K, and provided with distributing-pipes, in combination with the generator C, gas-holder D, connected to the generator, and suitable pipes, G H, connecting the holder with the distributing-pipes in the tank or receptacle, substantially as described.

JAMES J. POWERS.

Witnesses:
H. A. WEST,
C. SEDGWICK.